US007567236B2

(12) United States Patent
Nakayama et al.

(10) Patent No.: US 7,567,236 B2
(45) Date of Patent: Jul. 28, 2009

(54) COMMUNICATIONS TERMINAL APPARATUS, RECEPTION APPARATUS, AND METHOD THEREFOR

(75) Inventors: Takehiro Nakayama, Yokohama (JP); Takashi Suzuki, Yokosuka (JP); Hideki Yukitomo, Yokohama (JP); Akira Kinno, Yokohama (JP); Hiroshi Fujimoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 834 days.

(21) Appl. No.: 11/023,456

(22) Filed: Dec. 29, 2004

(65) Prior Publication Data

US 2005/0165973 A1 Jul. 28, 2005

(30) Foreign Application Priority Data

Jan. 22, 2004 (JP) ............................. 2004-014599

(51) Int. Cl.
*G09G 5/00* (2006.01)
(52) U.S. Cl. ..................... 345/168; 345/172; 715/811; 715/816
(58) Field of Classification Search ......... 345/156–158, 345/162, 168–173; 715/811, 816, 840–841, 715/760–763, 845; 710/1
See application file for complete search history.

(56) References Cited

U.S. PATENT DOCUMENTS

| 5,200,988 | A | 4/1993 | Riskin et al. |
| 5,703,581 | A | 12/1997 | Matias et al. |
| 5,818,437 | A | 10/1998 | Grover et al. |
| 7,395,512 | B2 | 7/2008 | Makabe et al. |
| 2003/0014449 | A1* | 1/2003 | Makabe et al. ............... 707/532 |

FOREIGN PATENT DOCUMENTS

| JP | 54-139356 A | 10/1979 |
| JP | 58144-246 A | 8/1983 |
| JP | 11-312046 A | 11/1999 |
| JP | 2003-15806 | 1/2003 |
| WO | WO 01/03307 A | 1/2001 |

OTHER PUBLICATIONS

Jacob Ziv et al. "A Universal Algorithm for Sequential Data Compression" IEEE Transactions on Information Theory 23(3), 337-343 (1977).
J. Bentley et al. "A Locally Adaptive Data Compression Scheme" Communications of the ACM, 29, 320-330 (1986).
Office Action of corresponding Japanese Patent Application No. 2004-014599 dated Aug. 6, 2008.

* cited by examiner

*Primary Examiner*—Richard Hjerpe
*Assistant Examiner*—Mansour M Said
(74) *Attorney, Agent, or Firm*—Crowell & Moring LLP

(57) ABSTRACT

A communications terminal apparatus, a reception apparatus, and a method can enhance the effect of reducing the amount of information to be transmitted when text data is generated and transmitted. The communications terminal apparatus 100 stores key identifier definition information in a key identifier definition-storage area 1071. The communications terminal apparatus 100 obtains a key identifier corresponding to an operated key from the key identifier definition-storage area 1071 when the key is operated, and adds and stores it as a key identifier string in the input key identifier storage area 1073. The communications terminal apparatus 100 transmits the key identifier string stored in the input key identifier storage area 1073 by the transmission function 1031 when a transmit instruction is detected.

11 Claims, 13 Drawing Sheets

*FIG. 3*

| INPUT KEY | KEY IDENTIFIER (4 BITS) |
|---|---|
| KEY 301 | 0000 |
| KEY 302 | 0001 |
| KEY 303 | 0010 |
| KEY 304 | 0011 |
| KEY 305 | 0100 |
| KEY 306 | 0101 |
| KEY 307 | 0110 |
| KEY 308 | 0111 |
| KEY 309 | 1000 |
| KEY 310 | 1001 |
| KEY 311 | 1010 |
| KEY 312 | 1011 |
| KEY 313 | 1100 |
| KEY 314 | 1101 |
| KEY 315 | 1110 |
| SPARE 1 | 1111 |

*FIG. 4*

| INPUT KEY | KEY IDENTIFIER (4 BITS) | CHARACTER | |
|---|---|---|---|
| | | NORMAL MODE | NUMERIC MODE |
| KEY 301 | 0000 | (SPACE) | 1 |
| KEY 302 | 0001 | ABC | 2 |
| KEY 303 | 0010 | DEF | 3 |
| KEY 304 | 0011 | GHI | 4 |
| KEY 305 | 0100 | JKL | 5 |
| KEY 306 | 0101 | MNO | 6 |
| KEY 307 | 0110 | PQRS | 7 |
| KEY 308 | 0111 | TUV | 8 |
| KEY 309 | 1000 | WXYZ | 9 |
| KEY 310 | 1001 | ,.?!*@$&= | |
| KEY 311 | 1010 | (NEXT) | 0 |
| KEY 312 | 1011 | (SELECT) | |
| KEY 313 | 1100 | (TRANSMIT) | |
| KEY 314 | 1101 | (MODE SWITCHING) | |
| KEY 315 | 1110 | (CONVERT) | |
| SPARE 1 | 1111 | | |

NOTE) (CONTROL COMMAND IN PARENTHESES)

*FIG. 5*

| LESS SIGNIFICANT 4 BITS \ SIGNIFICANT 4 BITS | 0000 | 0001 | 0010 | 0011 | 0100 | 0101 | 0110 | 0111 |
|---|---|---|---|---|---|---|---|---|
| 0000 | NUL | DLE | SPACE | 0 | @ | P | ` | p |
| 0001 | SOH | DC1 | ! | 1 | A | Q | a | q |
| 0010 | STX | DC2 | " | 2 | B | R | b | r |
| 0011 | ETX | DC3 | # | 3 | C | S | c | s |
| 0100 | EOT | DC4 | $ | 4 | D | T | d | t |
| 0101 | ENQ | NAK | % | 5 | E | U | e | u |
| 0110 | ACK | SYN | & | 6 | F | V | f | v |
| 0111 | BEL | ETB | ' | 7 | G | W | g | w |
| 1000 | BS | CAN | ( | 8 | H | X | h | x |
| 1001 | HT | EM | ) | 9 | I | Y | i | y |
| 1010 | LF | SUB | * | : | J | Z | j | z |
| 1011 | VT | ESC | + | ; | K | [ | k | { |
| 1100 | FF | IS4 | , | < | L | \ | l | \| |
| 1101 | CR | IS3 | - | = | M | ] | m | } |
| 1110 | SO | IS2 | . | > | N | ^ | n | ~ |
| 1111 | SI | IS1 | / | ? | O | _ | o | DEL |

FIG. 6 a
abacus
abandon
abase
abash
abate
abbey
abbreviate
.....
.....
babble
babe
baby
bachelor
back
.....
.....
yellow
yen
yes
yesterday
yet
.....
.....
zoom
zucchini

*FIG. 14*

| KEY | KEY IDENTIFIER (4 BITS) | CHARACTER | | |
|---|---|---|---|---|
| | | NORMAL MODE | | NUMERIC MODE |
| | | JAPANESE | ENGLISH | |
| KEY 301 | 0000 | A I U E O | (SPACE) | 1 |
| KEY 302 | 0001 | KA KI KU KE KO | ABC | 2 |
| KEY 303 | 0010 | SA SHI SU SE SO | DEF | 3 |
| KEY 304 | 0011 | TA CHI TU TE TO | GHI | 4 |
| KEY 305 | 0100 | NA NI NU NE NO | JKL | 5 |
| KEY 306 | 0101 | HA HI FU HE HO | MNO | 6 |
| KEY 307 | 0110 | MA MI MU ME MO | PQRS | 7 |
| KEY 308 | 0111 | YA YU YO | TUV | 8 |
| KEY 309 | 1000 | RA RI RU RE RO | WXYZ | 9 |
| KEY 310 | 1001 | (SPACE)、。「」 | ,.?!*@$&= | |
| KEY 311 | 1010 | WA WO N | (NEXT) | 0 |
| KEY 312 | 1011 | (SELECT) | (SELECT) | |
| KEY 313 | 1100 | (TRANSMIT) | (TRANSMIT) | |
| KEY 314 | 1101 | (MODE SWITCHING) | (MODE SWITCHING) | |
| KEY 315 | 1110 | (CONVERT) (NEXT) | (CONVERT) | |
| KEY 316 | 1111 | (JAPANESE/ENGLISH) | (JAPANESE/ENGLISH) | |

NOTE) (CONTROL COMMAND IN PARENTHESES)

COMMUNICATIONS TERMINAL APPARATUS, RECEPTION APPARATUS, AND METHOD THEREFOR

BACKGROUND OF THE INVENTION

1. Field of the Invention

The present invention relates to a communications terminal apparatus, a reception apparatus, and a method for transmitting and receiving text data generated in a key operation.

2. Description of the Related Art

Conventionally, a technology of generating text data and converting Kana to Kanji by operating the keyboard of a personal computer, a mobile telephone, etc. has been studied (for example, refer to U.S. Pat. No. 5,818,437, JP11-312046A, JP54-139356A and JP58-144246A.

Furthermore, in recent years, in a communications terminal such as a mobile telephone, etc., a service of transmitting text data generated using an input interface such as a keyboard, etc. has become widely spread.

In the conventional technology, text data is represented by a standardized character code string. As a standardized character code string, for example, ASCII (American Standard Code for Information Interchange) is used in English, and Shift-JIS (Japanese Industrial Standards) is used in Japanese. Since a character code corresponds one to one to a character, it is necessary to define codes for the number of types of characters used. For example, English ASCII having a relatively smaller number of types of characters requires 8 bits to represent one character while Japanese Shift-JIS having a larger number of types of characters requires 16 bits. Generally, when text data is transmitted, a character code string configuring a plurality of character codes is transmitted. The amount of information is obtained by a product of the amount of information specific to character code (for example, 8 bits for ASCII) and the number of character codes. When a character code string is represented by a smaller amount of information, the communications cost can be reduced. Therefore, the band width which is the resources can be more efficiently used.

Since there are several text data compressing methods in which a given character code string is represented by a smaller number of codes, it is possible to reduce the text data transmission cost using these methods. For example, when a character is input by a user from an input interface such as a keyboard, etc., the communications terminal generates a character code string (text data to be transmitted), compresses the character code string in the text data compressing method such as the LZ77 (for example, refer to "A Universal Algorithm for Sequential Data Compression" IEEE Transactions on Information Theory 23 (3):337-343 (1977) by Jacob Ziv, Abraham Lempel; hereinafter referred to as Reference 1), the BSTW (for example, refer to "A locally adaptive data compression scheme" Communications of the ACM, 29:320-330, 1986 by J. Bentley, D. Sleator, R. Tarjan, and V. Wei; hereinafter referred to as Reference 2), etc., and then transmits the compressed data. Then, the receiving communications terminal restores the compressed data to the original character code string in the decompressing method corresponding to the compressing method, and displays the result on the output interface such as a display, etc. The compressing methods such as the LZ77, the BSTW, etc. are performed by using the bias of the distribution of the array of code string (frequency and position information about a specific array are defined as a feature amount), and replacing a part of the code string with a smaller number of codes.

However, since the above-mentioned conventional methods represent by codes not only the number of types of characters but also the pointer to the specific character code string and the position information, the amount of information specific to a code increases (since there are restrictions on the type of characters representable by the same bit, it is also possible not to increase the amount of information specific to a code) and sufficient compression efficiency cannot be attained. However, since the decrease of the number of codes compensates for the increase of the amount of information specific to codes, the methods can be practically used.

As described above, it is not possible to sufficiently reduce the amount of information about text data to be transmitted.

SUMMARY OF THE INVENTION

The present invention has been developed to solve the above-mentioned problems, and aims at providing a communications terminal apparatus, a reception apparatus, and a method for enhancing the effect of reducing the amount of information to be transmitted when text data is generated and transmitted.

To solve the above-mentioned problems, the first aspect of the invention includes: a plurality of keys: key identifier definition-storage means for storing a key identifier uniquely corresponding to each of the plurality of keys; input key identifier storage means for adding and storing as a key identifier string a key identifier corresponding to a key obtained by the key identifier definition-storage means when at least one of the plurality of keys is operated; and transmission means for transmitting a key identifier string stored in the input key identifier storage means when a transmit instruction is detected.

Based on the first aspect of the invention, the communications terminal apparatus can generate and transmit the key identifier string of a smaller amount of information by defining a key identifier by the smallest amount of information capable of representing each key when generating and transmitting a key identifier string which is an array of a key identifier uniquely corresponding to an operated key. Therefore, the effect of reducing an amount of information can be enhanced when transmitting text data. Thus, the communications cost can be reduced, and the network resources of a band width, etc. can be used efficiently.

The second aspect of the invention is based on the communications terminal apparatus according to the first aspect, and further includes: character code definition-storage means for storing at least one character code corresponding to each of the plurality of keys; and character string presentation means for presenting a candidate character string represented by a character code string corresponding to a key identifier string stored in the input key identifier storage means and discriminated based on a character code stored in the character code definition-storage means.

Based on the second aspect of the invention, the communications terminal apparatus presents a candidate character string represented by a character code string corresponding to a key identifier string. Therefore, a user can confirm what type of candidate character string is generated by a key operation.

The third aspect of the invention is based on the communications terminal apparatus according to the second aspect, and further includes language knowledge storage means for storing language knowledge data for analysis of a character string. The character string presentation means further analyzes based on language knowledge data stored in the language knowledge storage means a candidate character string discriminated based on a character code stored in the character code definition-storage means, and presents a corresponding character string as a candidate.

Based on the third aspect of the invention, the communications terminal apparatus is provided with language knowledge storage means, and therefore the candidate character string discriminated based on the character code stored in the character code definition-storage means is further analyzed based on the language knowledge data, thereby narrowing candidate character strings.

The fourth aspect of the invention is based on the communications terminal apparatus according to any of the first to third aspects, and further includes character string determination means for determining one candidate character string to be presented by the character string presentation means. The transmission means transmits a key identifier string stored in the input key identifier storage means only when there is one candidate character string to be presented by the character string presentation means.

Based on the fourth aspect of the invention, the communications terminal apparatus transmits a key identifier string stored in the input key identifier storage means only when there is only one candidate character string to be presented by the character string presentation means. Therefore, when the number of candidate character strings is not one, the transmission of the key identifier string can be suppressed. Therefore, when a receiving apparatus discriminates a character code string from a received key identifier string, the ambiguity due to failure in discrimination of one character code string can be prevented.

The fifth aspect of the invention is based on the communications terminal apparatus according to any of the first to fourth aspects, and the transmitting means transmits a key identifier string stored in the input key identifier storage means after compressing the key identifier string.

Based on the fifth aspect of the invention, the communications terminal apparatus transmits a key identifier string after compressing it. Therefore, not only the amount of information about the code itself representing a character can be reduced by using a key identifier, but also the number of codes to be compressed can be reduced. As a result, the amount of information to be transmitted can further be reduced, thereby reducing the text data transmission cost.

The sixth aspect of the invention is based on the communications terminal apparatus according to any of the first to fifth aspects, and the plurality of keys include a key for selection of the type of language.

Based on the sixth aspect of the invention, the communications terminal apparatus is provided with a key for selection of the type of language. Therefore, the user can input a character with the type of language switched by a key operation. Furthermore, since the key identifier string stored in the input key identifier storage means includes a key identifier corresponding to the key for selection of the type of language, it is possible to discriminate the selected type of language based on the key identifier. Therefore, a key identifier string representing characters of a plurality of languages can be generated with a small amount of information without defining a number of key identifiers depending on the type of language, thereby performing efficient transmission.

The seventh aspect of the invention is based on the communications terminal apparatus according to any of the first to sixth aspects, and when the key identifier is configured by the amount of information of n (n is a natural number) bits, the number of the plurality of keys is larger than (n−1)th power of 2, and is equal to or smaller than n-th power of 2.

Based on the seventh aspect of the invention, when the number of a plurality of keys is larger than (n−1)th power of 2, and is equal to or smaller than n-th power of 2, the key identifier can be configured by the amount of information of n bits. Therefore, the key identifier can be defined by the smallest possible amount of information depending on the number of key, thereby reducing the transmission cost to the minimum value and attaining the highest transmission efficiency.

The eighth aspect of the invention is based on the communications terminal apparatus according to any of the first to seventh aspects, and further includes: reception means for receiving the key identifier string from an external device; and character code string discrimination means for discriminating a character code string corresponding to the key identifier string based on the key identifier string received by the reception means.

Based on the eighth aspect of the invention, the communications terminal apparatus discriminates a character code string corresponding to a key identifier string received from an external device based on the key identifier string. Therefore, the communications terminal apparatus can present the character code string corresponding to the key identifier string received from the external device after converting it into a character string which can be recognized by a user.

The ninth aspect of the invention is based on a reception apparatus including: reception means for receiving the key identifier string from the communications terminal apparatus according to any of the first to eighth aspects; and character code string discrimination means for discriminating based on a key identifier string received by the reception means a character code string corresponding to the key identifier string.

Based on the ninth aspect of the invention, the reception apparatus discriminates a character code string corresponding to a key identifier string received from a communications terminal apparatus based on the key identifier string.

Therefore, a user can use the reception apparatus as a simple apparatus for receiving a key identifier string from the communications terminal apparatus, converting it to a character string, and presenting the result.

The tenth aspect of the invention provides a method for directing a computer to perform, comprising: a key identifier string discriminating step of discriminating whether or not, when an operation signal of a key is detected, a key identifier corresponding to the key represents a transmit instruction; a code string storing step of adding and storing the key identifier as a key identifier string in a key identifier storage area when it is discriminated in the key identifier string discriminating step that the key identifier does not represent a transmit instruction; and a transmitting step of transmitting a key identifier string stored in the key identifier storage area when it is discriminated in the key identifier string discriminating step that the key identifier represents a transmit instruction.

Based on the tenth aspect of the invention, the computer performs according to the method to add and store a key identifier as a key identifier string in the key identifier storage area as a key identifier string when the key identifier corresponding to an operated key does not represent a transmit instruction, and transmits the key identifier string stored in the key identifier storage area only when the key identifier represents a transmit instruction. Therefore, a key identifier can be defined by a smaller amount of information, and text data can be represented and transmitted as a key identifier string, thereby enhancing the effect of reducing the amount of information to be transmitted. As a result, the communications cost can be reduced, and network resources can be efficiently used.

According to the present invention, the communications terminal apparatus generates and transmits a key identifier string which is an array of key identifiers uniquely corresponding to an operated key. Therefore, by defining a key identifier by the smallest amount of information which can represent each key, a key identifier string of a small amount of information can be generated and transmitted, thereby enhancing the effect of reducing the amount of information when text data is transmitted. Thus, the communications cost can be reduced, and the network resources such as a band width, etc. can be efficiently used.

BRIEF DESCRIPTION OF THE DRAWINGS

FIG. 3 shows an example of the correspondence between an input key and a key identifier according to an embodiment of the present invention;

FIG. 4 shows an example of the correspondence among a key, a key identifier, and a character according to an embodiment of the present invention;

FIG. 5 is a correspondence table between a character by ASCII and a character code according to an embodiment of the present invention;

FIG. 6 shows an example of language knowledge data according to an embodiment of the present invention;

FIG. 14 shows an example of the definition of the correspondence among a key, a key identifier, and a character according to a variation 2;

DETAILED DESCRIPTION OF THE PREFERRED EMBODIMENTS

Figure 1:
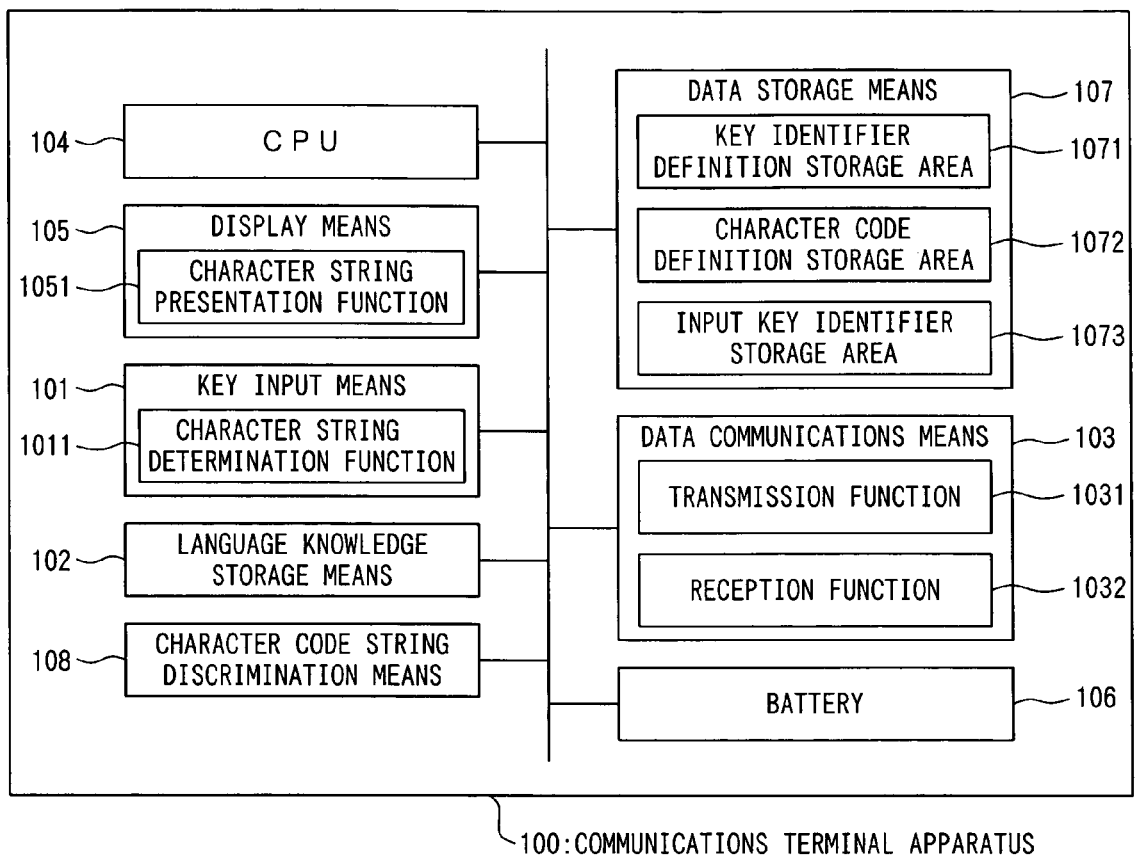
FIG. 1 is a block diagram showing an example of the configuration of the communications terminal apparatus according to an embodiment of the present invention.

The best mode for embodying the present invention is explained below by referring to the attached drawings. In the drawings referred to in the explanation below, identical units are assigned the same reference numerals.

(1. Configuration)

FIG. 1 shows the configuration of a communications terminal apparatus 100 showing an example of the embodiment of the present invention.

The communications terminal apparatus 100 shown in FIG. 1 is a PDA (Personal Digital Assistance) with communication facility or a mobile wireless communications equipment such as a mobile telephone, a PHS (Personal Handyphone System), etc. The communications terminal apparatus 100 is not limited to wireless communications equipment, but can be cable communications equipment. However, the outstanding advantage of the present invention is reflected on mobile wireless communications equipment indicating a smaller number of input keys.

As shown in FIG. 1, the communications terminal apparatus 100 comprises key input means 101, language knowledge storage means 102, data communications means 103, a CPU 104, display means 105, a battery 106, and data storage means 107.

The key input means 101 is configured by including a keyboard having a plurality of keys. In the embodiment of the present invention, one key corresponds to one or more characters (including numbers) and a control command. In the explanation below, a control command is assumed to be a kind of character.

Figure 2:
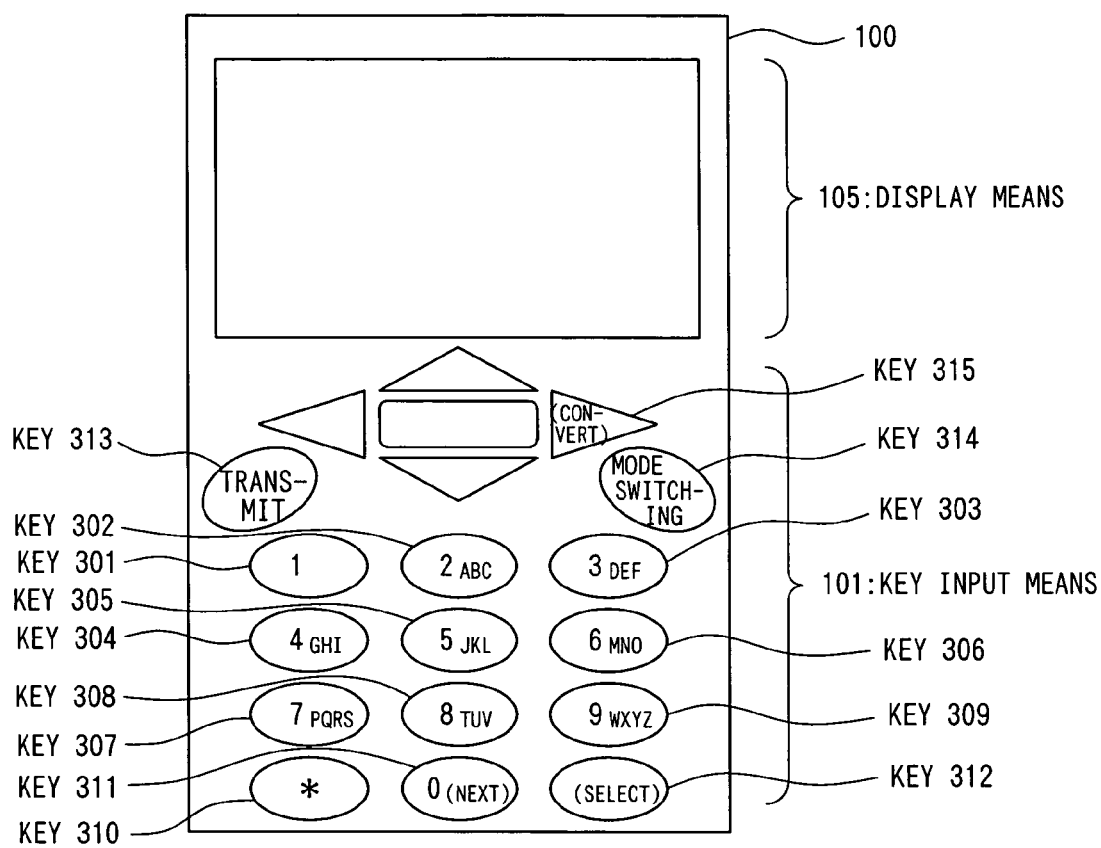
FIG. 2 shows an example of the appearance of the communications terminal apparatus according to an embodiment of the present invention.

The correspondence between a key and a character is explained below by referring to FIG. 2 showing an example of the appearance of the communications terminal apparatus 100. The key array shown in FIG. 2 corresponds to a typical mobile telephone. That is, a key 301 indicates a character set {1, (space)}, a key 302 indicates a character set {2, A, B, C}, a key 303 indicates a character set {3, D, E, F}, a key 304 indicates a character set {4, G, H, I}, a key 305 indicates a character set {5, J, K, L}, a key 306 indicates a character set {6, M, N, O}, a key 307 indicates a character set {7, P, Q, R, S}, a key 308 indicates a character set {8, T, U, V}, a key 309 indicates a character set {9, W, X, Y, Z}, a key 310 indicates a character set {punctuation mark, specific symbol}, a key 311 indicates a character set {0, (NEXT) }, a key 312 indicates a character set {(SELECT)}, a key 313 indicates a character set {(TRANSMIT) }, a key 314 indicates a character set {(MODE SWITCHING) }, and a key 315 indicates a character set {(CONVERT) }. The punctuation mark indicates {. , ? !}, etc., and a specific symbol indicates a symbol other than a number, an alphabetical character, a punctuation mark, a space, for example, {* @ $ & =}, etc.

(NEXT) is a control command to request a next candidate. When a candidate character string for conversion is not a desired one, a user operates the key 311 corresponding to the control command (NEXT). When the CPU 104 of the communications terminal apparatus 100 detects that the key 311 is operated, it issues an instruction to request a next candidate. An operation to be detected by the CPU 104 of the communications terminal apparatus 100 can be touching or turning other than pressing a key. (SELECT) is also a control command, and when a candidate character string for conversion is desired by a user, it is used to indicate the request of the user. When (SELECT) is selected, the space indicating a delimiter of a word can be automatically appended to the character string.

(MODE SWITCHING) is a control command to issue an instruction to switch an input mode, and is used to switch between a character other than a number and a number. In the present embodiment, a number is excluded in the character set in a normal mode. However, when a control command (MODE SWITCHING) is given in the normal mode, a character other than a number is excluded. In an input mode in which a character other than a number is excluded, if a control command (MODE SWITCHING) is given, then control is returned to a normal mode.

(CONVERT) indicates a delimiter of a word and a phrase, and issues a command to specify the reference of language knowledge data for resolution of ambiguity of an input character string. (TRANSMIT) is a control command to issue an instruction to transmit text data (key identifier string) generated by a key operation.

The function of determining one candidate character string to be displayed on the display means 105 by issuing a control command such as the above-mentioned (SELECT), (NEXT), and other control commands is referred to as a character string determination function 1011.

In the present invention, the key array is not limited to the example shown in FIG. 2, but any other array can be used. The correspondence between a key and a character is also not limited to the above-mentioned example, but can be any other correspondences. Also the type of character can be discriminated between an upper case and a lower case, can be a character of a language other than English, or can be a glyph.

The data storage means 107 shown in FIG. 1 is to store various data, and is configured by a magnetic disk, flash memory, etc. For example, the data storage means 107 stores software for control of the communications terminal apparatus 100 such as communications software, an operating system, etc., and software for generation and transmission of the text data relating to the present invention. The data storage means 107 also stores a symbol corresponding to a key input by the key input means 101.

The data storage means 107 comprises a key identifier definition storage area 1071, a character code definition storage area 1072, and a input key identifier storage area 1073 as a storage area specific to the present invention. The key identifier definition storage area 1071 stores key identifier definition information for definition of a key identifier uniquely corresponding to each key. The character code definition storage area 1072 stores character code definition information for definition of a character code corresponding to each key. In the present embodiment, the character code definition information is configured by a "correspondence table among a key, a key identifier, and a character" and a "correspondence table between a character code and a character". The input key identifier storage area 1073 additionally stores a key identifier corresponding to an operated key as a key identifier string.

FIG. 3 shows an example of the key identifier definition information stored in the key identifier definition storage area 1071 of the data storage means 107. The key identifier defined in the present invention requires only the amount of information with which the number of keys can be represented in binary. For example, when the number of keys is 9 or more and 16 or less, 4 bits are to be defined as the smallest amount of information about the key identifier. In this case, to represent 15 keys of the communications terminal apparatus 100 shown in FIG. 2, the key identifier is defined by 4 bits.

FIG. 4 show an example of the correspondence table among a key, a key identifier, and a character stored in the 1072 of the data storage means 107. In this example, since the key and the key identifier corresponds one to one to each other, the correspondence between the key identifier and the character can be signal indicated by the correspondence between the key and the character. Therefore, the table shown in FIG. 4 can be transformed into a correspondence table between the key and the character, and can be transformed into a correspondence table between the key identifier and the character. Furthermore, the key identifier definition information shown in FIG. 3 can be included in the correspondence table shown in FIG. 4.

FIG. 5 shows an example of a correspondence table between a character and a character code in binary notation stored in the character code definition storage area 1072 of the data storage means 107. In the correspondence table of FIG. 5, a character code is represented in the ASCII system.

In the present embodiment, the character code definition information is represented in a table format as shown in FIGS. 4 and 5, but the character code definition information only has to be information indicating the correspondence between a key and a character code, and in not limited to the above-mentioned data configuration.

The input key identifier storage area 1073 sequentially adds and stores a key identifier corresponding to an operated key as a key identifier string until the key 313 corresponding to the control command (TRANSMIT) is operated. That is, when a user operates a key, the key identifier corresponding to the operated key is retrieved and obtained from the key identifier definition information stored in the key identifier definition storage area 1071. When the obtained key identifier does not correspond to the control command (TRANSMIT), the obtained key identifier is added and stored as the trailer of the key identifier string stored in the input key identifier storage area 1073. For example, when a user presses the key 303, the key identifier "0010" corresponding to the key 303 is added as the trailer of the key identifier string stored in the input key identifier storage area 1073 (hereinafter referred to as "append").

The language knowledge storage means 102 shown in FIG. 1 stores language knowledge data for resolution of ambiguity of input by the key input means 101, and is configured by a magnetic disk, flash memory, etc.

The ambiguity of input is explained below. In the present invention, since the key of the key input means 101 corresponds one to many to characters (they can correspond one to one, but the correspondence of one to one is assumed to be a special case of the correspondence of one to many), it is assumed that a character set is specified including a character desired by the user and a character not desired by the user when the user operates one key. Thus, when there are a plurality of characters corresponding to an input key, it is referred to as the ambiguity of correspondence between the input key and the characters.

FIG. 6 shows a part of language knowledge data. In the present embodiment, an English word list arranged in an alphabetical order is used as language knowledge data. By referring to the language knowledge data, the ambiguity of correspondence between an input key and characters can be solved by the conventional technology of excluding what is not registered in the language knowledge data from the candidate character strings which can be generated from an input key. For example, using the methods disclosed by the U.S. Pat. No. 5,818,437 and JP11-312046A, the problem can be solved.

In the present embodiment, a word list is used as language knowledge data, but the lexicon (word list extended to inflection) can be used as language knowledge data by replacing the word list, and a connective character string (n-gram) can also be used as language knowledge data. Additionally, the entry of each word, lexicon, and connective character string can be assigned an occurrence probability to prioritize a candidate character string matching a higher occurrence probability.

Otherwise, the data storage means 107 can also function as the language knowledge storage means 102.

The data communications means 103 is configured to include an antenna and communications software to communicate data with the communications terminal apparatus 100 which is a communications partner through a wireless network such as a mobile telephone network, a PHS network, a wireless LAN (Local Area Network), etc.

The data communications means 103 has a transmission function 1031 and a reception function 1032. The transmission function 1031 transmits a key identifier string stored in the input key identifier storage area 1073 when it detects a transmit instruction by a key operation of a user. The reception function 1032 receives a key identifier string from an external device.

A character code string discrimination means 108 analyzes an array of key identifiers configuring a received key identifier string from the head when it receives the key identifier string by the reception function 1032 of the data communications means 103, and discriminates a character code string corresponding to the key identifier string.

The display means 105 is configured by including a liquid crystal display, and is used as means for providing a user interface for display of an input character in the key input means 101 according to the present invention. Practically, the communications terminal apparatus 100 has a character string presentation function 1051, and using the character string presentation function 1051 a candidate character string is replaced with a corresponding character (font) string, and displayed it on the display means 105.

In the present embodiment, a candidate character string input through the key input means 101 is presented to a user by displaying a candidate character string on the display means 105, but the presenting method is not limited to this. For example, a presenting method by voice and a character string can be used.

The CPU 104 performs an arithmetic operation as the communications terminal apparatus 100. The battery 106 supplies electric power required to operate the communications terminal apparatus 100.

(2. Flow of Process)

Figure 7:
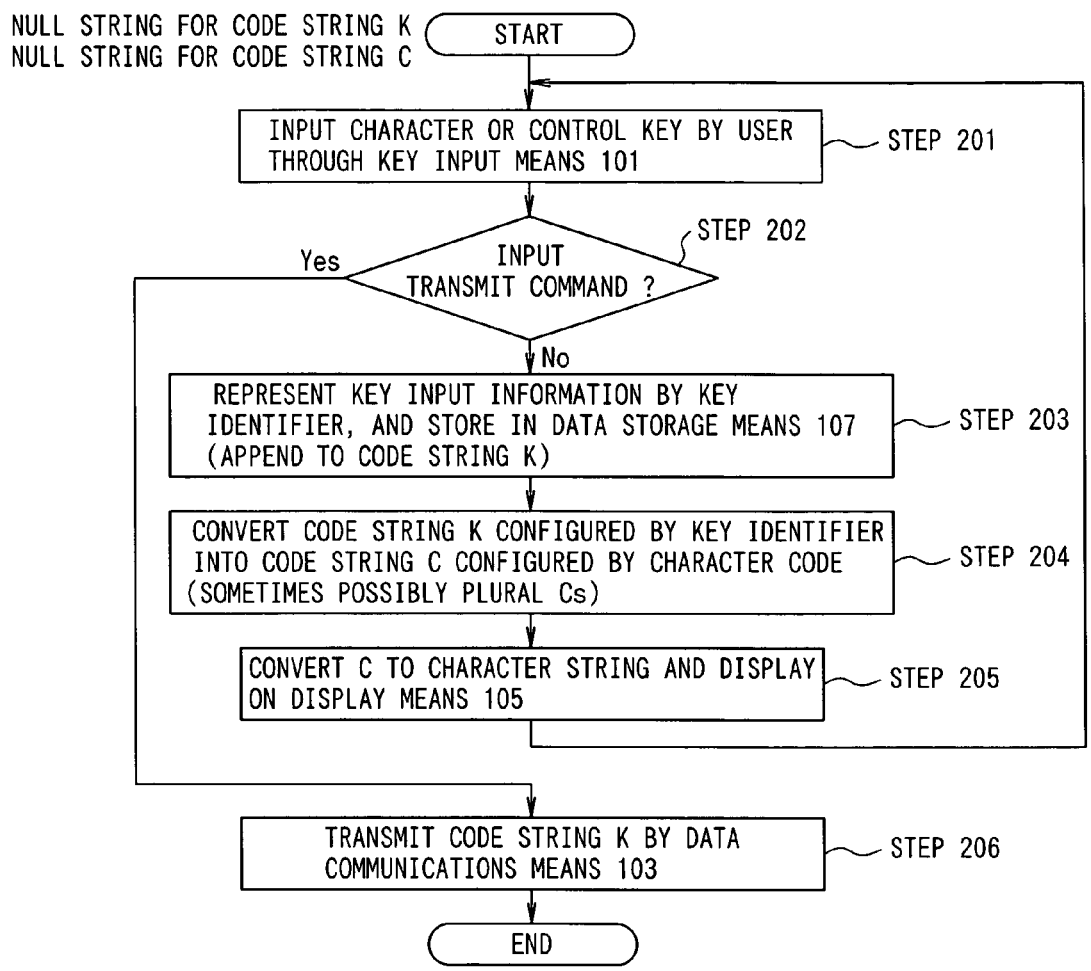
FIG. 7 shows an example of a flow of the process from generation to transmission of text data.

FIG. 7 shows an example of a flow of the process from generation to transmission of text data in the communications terminal apparatus 100. As the preparation before starting the flow shown in FIG. 7, the initial status of a code string K and a code string C used as variables is a null string.

The code string K is a variable indicating a string of key identifiers one to one corresponding to key input. The code string K is used in transmitting text data, and a device for reducing the amount of information is made. The code string C is a variable indicating a string of common character codes. In this example, the ASCII system which is formed by standard character codes is used. The code string C is used for a user in presenting text data (candidate character string) input using keys. A series of processes shown in FIG. 7 are realized by the CPU 104 performing an arithmetic operation according to the software stored in the data storage means 107.

In FIG. 7, when the process is started, the user of the communications terminal apparatus 100 presses the key corresponding to the character configuring the text to be transmitted, or the key corresponding to the control command to be specified using the key input means 101 in step 201.

In step 202, the communications terminal apparatus 100 determines in step 201 whether or not the key pressed by the user corresponds to the control command (TRANSMIT) by referring to the key identifier definition information stored in the key identifier definition storage area 1071 and the character code definition information stored in the character code definition storage area 1072. In this example, since the communications terminal apparatus 100 has the key array as shown in FIG. 2, the key 313 uniquely corresponds to the control command (TRANSMIT) as shown in FIG. 4. Therefore, when the key 313 is pressed, control is passed to step 206.

When control is passed to step 206, the communications terminal apparatus 100 obtains the code string K from the input key identifier storage area 1073 of the data storage means 107, and transmits the code string K to the communications terminal which is the communications partner by the transmission function 1031 of the data communications means 103. Then, the communications terminal apparatus 100 initializes the code string K and the code string C to a null string.

On the other hand, when a key other than the key 313 is pressed, the pressed key does not correspond to the control command (TRANSMIT), thereby passing control to step 203. When control is passed to step 203, the communications terminal apparatus 100 obtains a key identifier corresponding to the key pressed by the user in step 201 (in the present embodiment, any of the keys 301 to 315) from the key identifier definition information stored in the key identifier definition storage area1071. The communications terminal apparatus 100 appends the obtained key identifier to the code string K, and stores the code string K in the input key identifier storage area 1073 of the data storage means 107.

In step 204, the communications terminal apparatus 100 determines the code string C corresponding to the code string K by referring to the key identifier definition information stored in the key identifier definition storage area 1071 and the character code definition information stored in the character code definition storage area 1072, and the determined code string C is stored in the data storage means 107. When the key identifier corresponds one to many to the character codes, a plurality of candidates can be determined as a code string C.

In step 205, the communications terminal apparatus 100 replaces the character code forming the code string C with the corresponding character (font) and displays it on the display means 105 by the character string presentation function 1051. After step 205, control is returned to step 201.

(3. Operation)

Next, the operation with the above-mentioned configuration is explained below. In this example, the user performs an operation of inputting a word "YES" as a transmit instruction, and the iterative process from step 201 to step 205 shown in FIG. 7 and the process in step 206 are explained in detail.

First, the user presses the key 309 including "Y" in the communications terminal apparatus 100 in the key array shown in FIG. 2 (step 201). Since the key 309 is not a transmit command, the determination in step 202 is NO, and control is passed to step 203.

Then, the communications terminal apparatus 100 obtains the key identifier "1000" corresponding to the key 309 from the key identifier definition information shown in FIG. 3 stored in the key identifier definition storage area 1071. The communications terminal apparatus 100 appends the key identifier "1000" to the code string K, and stores the code string K (at this time, K is "1000") in the input key identifier storage area 1073 of the data storage means 107 (step 203).

Then, in step 204, the communications terminal apparatus 100 converts the code string K to the code string C by referring to the key identifier definition information stored in the key identifier definition storage area 1071 and the character code definition information stored in the character code definition storage area 1072. Practically, as shown in FIG. 4, in the normal mode, the character corresponding to the key identifier "1000" has four candidates {W, X, Y, Z}. Furthermore, by referring to the correspondence table between the character and the character code as shown in FIG. 5, the characters W, X, Y, and Z are represented by 8-bit character codes "01010111", "01011000", "01011001", and "01011010" respectively. Therefore, the code string C obtained from the code string K can have four candidates {"01010111", "01011000", "01011001", "01011010"}. The communications terminal apparatus 100 stores the code string C in the data storage means 107.

Figure 8:
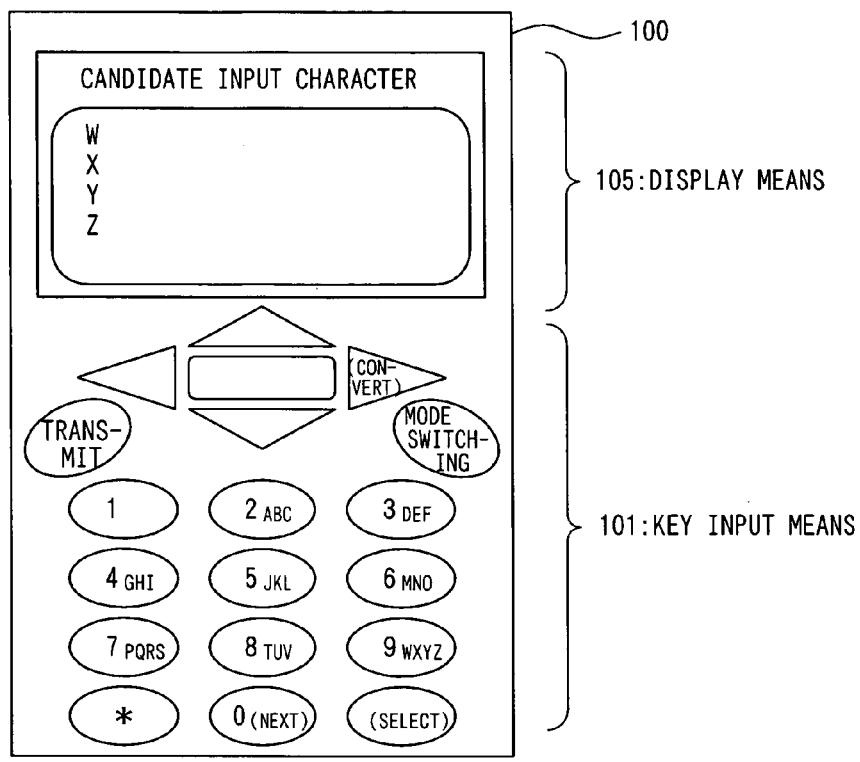
FIG. 8 shows an example of input display in the communications terminal apparatus according to an embodiment of the present invention.

Then, in step 205, the communications terminal apparatus 100 generates data (font) for display of characters respectively corresponding to the four character codes forming the code string C by the character string presentation function 1051, and displays the data on the display means 105. FIG. 8 shows an example of display on the display means 105 of the communications terminal apparatus 100.

Then, in step 201, the above-mentioned processes are repeated. In step 201, the user presses the key 303 including "E". Since the key 303 does not indicate a transmit command, the determination in step 202 is NO, thereby passing control to step 203.

Then, the communications terminal apparatus 100 obtains the key identifier "0010" corresponding to the key 303 according to the key identifier definition information stored in the key identifier definition storage area 1071. The communications terminal apparatus 100 appends the obtained key identifier "0010" to the code string K, and stores the code string K (at this time, K is "1000 0010") in the input key identifier storage area 1073 of the data storage means 107 (step 203).

In step 204, the communications terminal apparatus 100 converts the code string K to the code string C. At this time, the character code corresponding to the key identifier "1000" is stored as the code string C in the data storage means 107. Therefore, it can be easily obtained by referring to the data storage means 107. On the other hand, the character corresponding to the key identifier "0010" has three candidates {D, E, F} in the normal mode as shown in FIG. 4. Furthermore, by referring to FIG. 5, character codes D, E, and F are respectively represented by "01000100", "01000101", and "01000110". Therefore, the code string C obtained from the code string K can have 12 candidates {"01010111 01000100", "0101100001000100", "0101100101000100", "0101101001000100", "01010111 01000101", "01011000 01000101", "01011001 01000101", "01011010 01000101", "01010111 01000110", "01011000 01000110", "01011001 01000110", "01011010 01000110"}. The communications terminal apparatus 100 stores the 12 candidates as the code string C in the data storage means 107.

Figure 9:
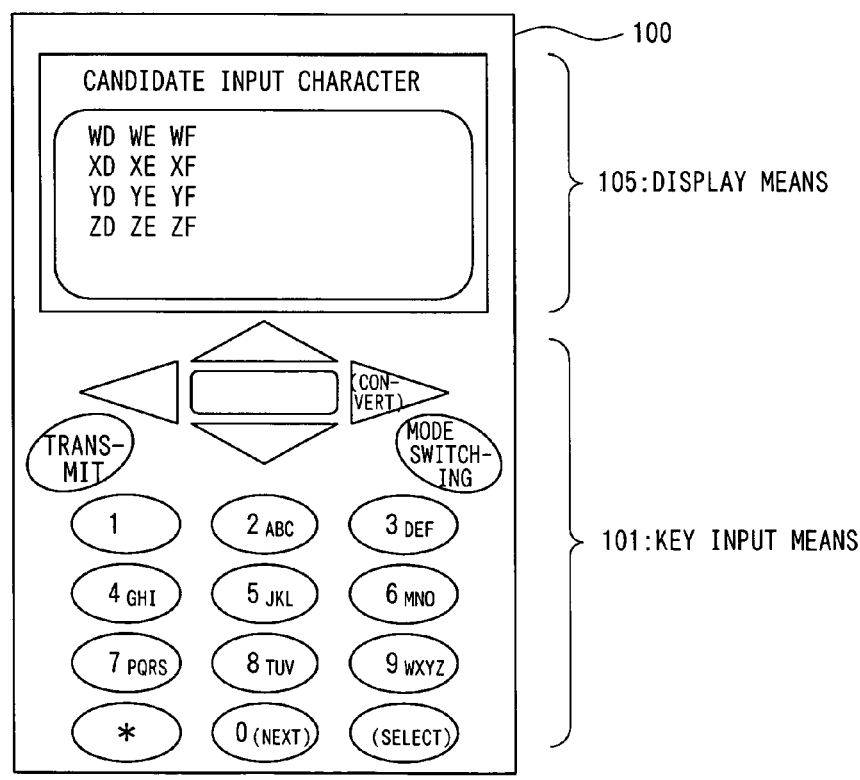
FIG. 9 shows an example of input display in the communications terminal apparatus according to an embodiment of the present invention.

Then, in step 205, the communications terminal apparatus 100 generates data for display of a character string corresponding to the candidate character code string based on the code string C by the character string presentation function 1051, and displays the data on the display means 105. FIG. 9 shows an example of display of the communications terminal apparatus 100 on the display means 105.

Figure 10:
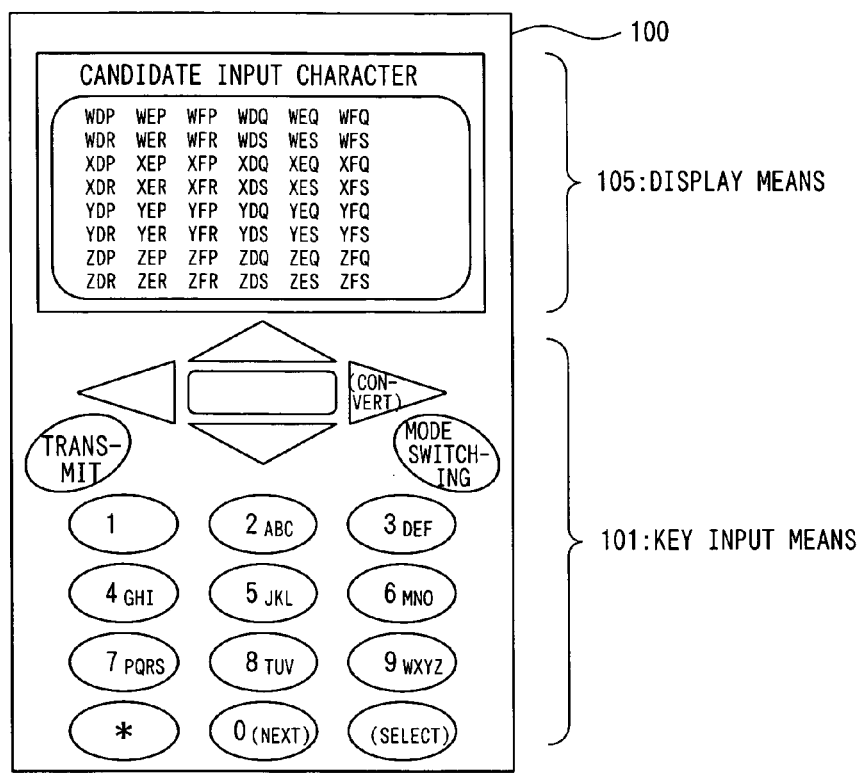
FIG. 10 shows an example of input display in the communications terminal apparatus according to an embodiment of the present invention.

Back in step 201, the above-mentioned processes are repeated. In step 201, the user presses the key 307 including "S". Since the procedure up to step 205 is the same as that described above, the explanation is omitted, but when the process in step 205 is completed, the code string K is "1000 00100110", and the code string C has 48 candidates of {"01010111 01000100 01010000", "01011000 01000100 01010000", "01011001 01000100 01010000", "01011010 01000100 01010000", "01010111 01000101 01010000", "01011000 01000101 01010000", "01011001 01000101 01010000", "01010111 01011010 01000101 01010000", "01010111 01000110 01010000", "01011000 01000110 01010000", "01011001 01000110 01010000", "01011010 01000110 01010000", "01010111 01000100 01010001", "01011000 01000100 01010001", "01011001 01000100 01010001", "01011010 01000100 01010001", "01010111 01000101 01010001", "01011000 01000101 01010001", "01011001 01000101 01010001", "01011010 01000101 01010001", "01010111 01000110 01010001", "01011000 01000110 01010001", "01011001 01000110 01010001", "01011010 01000110 01010001", "01010111 01000100 01010010", "01011000 01000100 01010010", "01011001 01000100 01010010", "01011010 01000100 01010010", "01010111 01000101 01010010", "01011000 01000101 01010010", "01011001 01000101 01010010", "01011010 01000101 01010010", "01010111 01000110 01010010", "01011000 01000110 01010010", "01011001 01000110 01010010", "01011010 01000110 01010010", "01010111 01000100 01010011", "01011000 01000100 01010011", "01011001 01000100 01010011", "01011010 01000100 01010011", "01010111 01000101 01010011", "01011000 01000101 01010011", "01011001 01000101 01010011", "01011010 01000101 01010011", "01010111 01000110 01010011", "01011000 01000110 01010011", "01011001 01000110 01010011", "01011010 01000110 01010011"}. FIG. 10 shows an example of the display on the display means 105 of the communications terminal apparatus 100 (step 205).

Then, back in step 201, the above-mentioned processes are repeated. In step 201, the user presses the key 315 corresponding to the control command (CONVERT) indicating the delimiter of a word and the language knowledge data. Since the key 315 is not a transmit command, the determination in step 202 is NO, and control is passed to step 203.

Then, the communications terminal apparatus 100 appends the key identifier "1110" corresponding to the key 315 to the code string K, and stores the code string K (at this time, K is "1000 0010 0110 1110") in the input key identifier storage area 1073 of the data storage means 107 (step 203).

Then, in step 204, the communications terminal apparatus 100 converts the code string K to the code string C. Since the trailing 4 bits of the code string K is control command (CONVERT), the ambiguity of the code string C is resolved using the language knowledge data shown in FIG. 6 stored in the language knowledge storage means 102. Although the code string C has 48 candidates for a character string, the communications terminal apparatus 100 determines whether or not each of the candidate character strings matches the entry of the language knowledge data (English word list). If the candidate character string does not match the entry of the language knowledge data, the candidate is deleted from the candidate character strings to mitigate the ambiguity.

According to the present embodiment, in the 48 character strings, only "YES" matches the entry of the language knowledge data. Therefore, the code string other than the code string "01011001 01000101 01010011" corresponding to "YES" is deleted from the code string c. That is, the code string C is "01011001 01000101 01010011". It is possible that the code string itself is not deleted from the code string C and deletion flag information is added, or selection flag information is added to the candidates.

Figure 11:
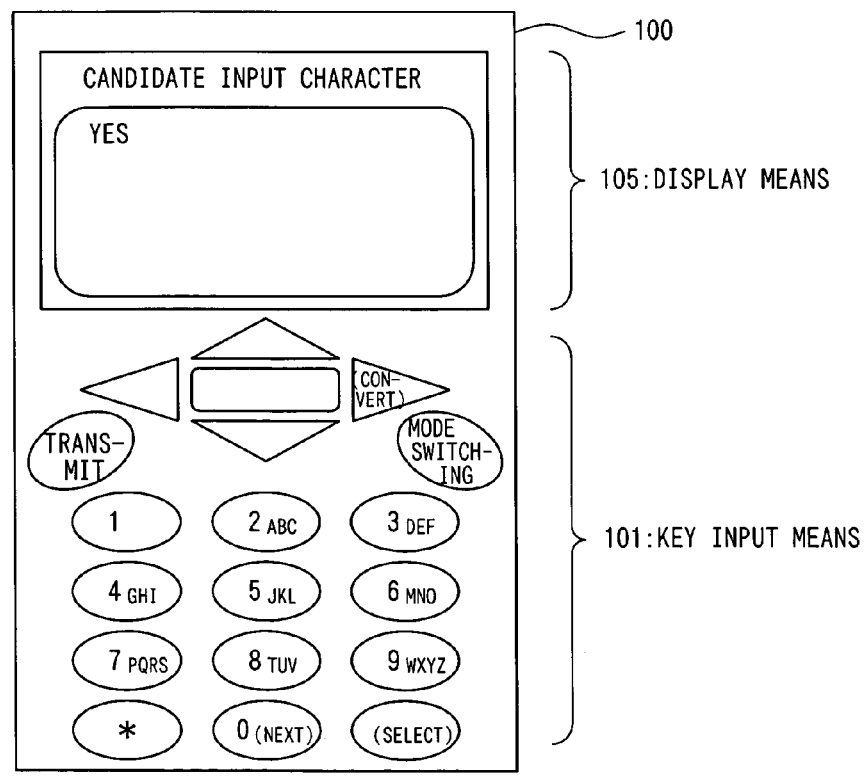
FIG. 11 shows an example of input display in the communications terminal apparatus according to an embodiment of the present invention.

Then, in step 205, the communications terminal apparatus 100 converts the code string C to a character string by the character string presentation function 1051, and displays it on the display means 105. FIG. 11 shows an example of display on the display means 105 of the communications terminal apparatus 100. In this example, only "YES" is displayed as a candidate input character, and the user can uniquely obtain a desired character string.

If a plurality of candidate character strings remain, the candidate character strings are displayed in the registration order of the language knowledge data or in the order of occurrence frequency assigned to language knowledge data. If the first candidate is not a desired character string, the user presses the key 311 in step 201, thereby issuing a (NEXT) command, and selecting a next candidate. The key identifier "0010" corresponding to the (NEXT) is appended to the code string K in step 203. If the next candidate is not a desired character string, the user presses key 311 in step 201, thereby issuing a (NEXT) command.

When a desired character string is narrowed from a plurality of candidate character strings, not only a user conversion indication is received in a unit of word, but each character can be sequentially narrowed, etc. using any conventional method.

In step 201, the user presses the key 313 corresponding to (TRANSMIT) to specify the transmission of text data "YES". As a result, the determination in step 202 is YES, and control is passed to step 206. In step 206, the communications terminal apparatus 100 transmits the code string K (at this time, K is "1000 0010 0110 1110") stored in the input key identifier storage area 1073 of the data storage means 107 by the transmission function 1031 of the data communications means 103. When the process in step 206 is completed, the flow shown in FIG. 2 terminated.

Thus, when text data is transmitted, the conventional technology transmits character code (in this example, the code string C "01011001 01000101 01010011", 24 bits). However, according to the present invention, a key identifier (in this example, the code string K "1000 0010 0110 1110", 16 bits) can be transmitted. Therefore, the amount of information of the text data to be transmitted can be reduced, and the transmission efficiency can be enhanced.

The difference between the character code and the key identifier basically depends on the difference in the amount of information about the code required in representing a character. When the alphabet is represented, the normally used ASCII requires 8 bits/character. However, as in the present embodiment, the key identifier when the alphabet is input using 15 types of keys can be represented by 4 bits/character. Therefore, the amount of information can be reduced as compared with the conventional technology.

In the present invention, the number of types of keys (the number of keys) can be optionally determined. Depending on the number of types of keys, a key identifier in which each key can be represented by a smaller amount of information, thereby obtaining advantageous transmission efficiency. For example, when the number of types of keys are 5 to 8, 3-bit key identifier is defined, when the number of types of keys are 9 to 16, 4-bit key identifier is defined, when the number of types of keys are 17 to 32, 5-bit key identifier is defined, when the number of types of keys are 33 to 64, 6-bit key identifier is defined, when the number of types of keys are 65 to 128, 7-bit key identifier is defined. In this way, the highest transmission efficiency can be obtained. That is, when the number of keys is larger than (n−1)th power of 2, and equal to or less than n-th power of 2 (n is a natural number), the key identifier can be defined to be configured by an amount of information of n bits.

When the number of types of keys is 129 or more, the key identifier of 8 bits or more is required. Therefore, it is not advantageous over the ASCII codes. When Japanese text data is to be transmitted, Japanese character code normally requires 16 bits/character as the Shift-JIS code. Therefore, when a key identifier which can be represented by 4-bit/character is used, the difference in transmission efficiency becomes larger, thereby attaining an advantageous function.

In the present invention, the code string K includes ambiguity of correspondence to character, and it is necessary to use language knowledge data for resolving ambiguity in the communications terminal on the receiving side. To resolve ambiguity, by using the language knowledge data in the same method as the communications terminal apparatus 100 on the transmission side, the transmitter (user of the communications terminal apparatus 100) desired character string can be realized. Therefore, it is necessary to add a key identifier corresponding to a control command such as (CONVERT) to the code string K. However, since the contribution of a smaller amount of information of the code is larger than the influence of the number of codes increasing by containing a control command, the total effect of reducing the amount of information can be obtained. In the above-mentioned embodiment, the 4-bit key identifier corresponding to the (CONVERT) is added to the code string K, but the total amount of information is smaller than the code string C.

As described above, the communications terminal apparatus 100 generates and transmits a key identifier string which is an array of the key identifier uniquely corresponds to the operated key. Therefore, the key identifier is defined by the smallest amount of information which can represent the number of types of key, thereby generating and transmitting a key identifier of a smaller amount of information. Therefore, the effect of reducing the amount of information when text data is transmitted can be enhanced. Thus, the communications cost can be reduced, and the network resources such as band width, etc. can be efficiently used.

Furthermore, using an input interface such as T9 etc. which has already been widely used, the compression efficiency of the text data can be improved without forcing the learning of a new input method to a user or without requesting an operation other than text input.

(4. Variations)

The embodiments of the present invention are described above, but the present invention is not limited to those embodiments, and variations can be devised in the range of the technical concept. An example of a variation can be as follows.

(Variation 1)

Figure 12:
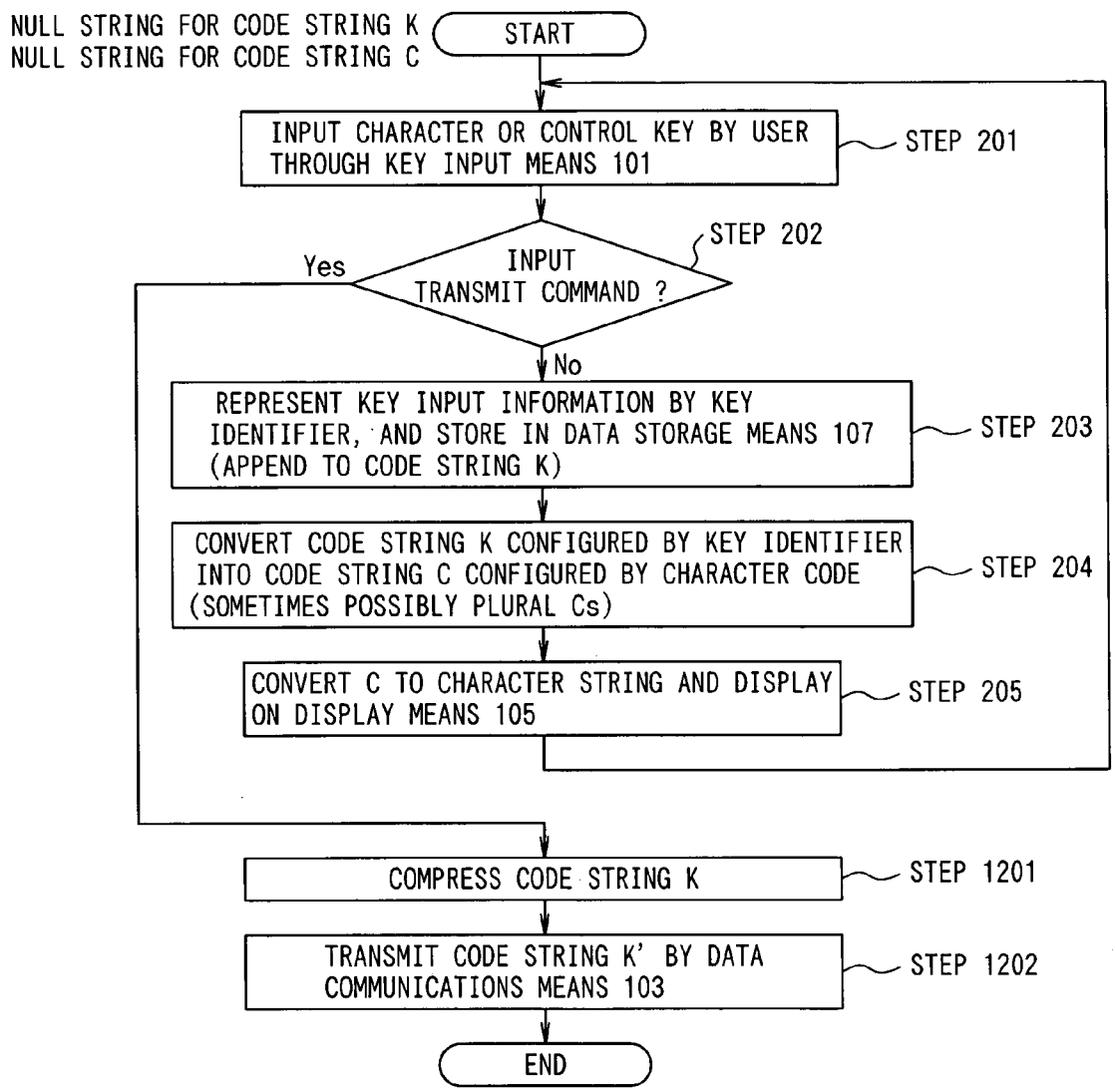
FIG. 12 shows an example of a flow of the process from generation to transmission of text data according to a variation 1.

In the present invention, the flow shown in FIG. 7 can be transformed into a flow including a compressing process as shown in FIG. 12. In FIG. 12, step 206 shown in FIG. 7 is replaced with steps 1201 and 1202. Other portions are the same as those shown in FIG. 7, and the explanation is omitted here.

In step 1201, the communications terminal apparatus 100 converts the code string K configured by a key identifier to a code string K' having a smaller number of codes. To realize this, a conventional text data compression algorithm is described as software and stored it in advance in the data storage means 107 shown in FIG. 1, and the CPU 104 can perform an arithmetic operation based on the software. As a conventional text data compression algorithm, for example, the algorithm described in the Reference 1.

Then, in step 1202, the communications terminal apparatus 100 transmits the code string K' by the transmission function 1031 of the data communications means 103. The code string K' can include flag information about the compressing process performed to decrease the number of codes by the specific text data compressing algorithm.

In an example of a variation, not only the amount of information about the code indicating a character can be reduced by using a key identifier, but also the number of codes can be reduced, thereby largely improving the text data transmission cost.

(Variation 2)

Figure 13:
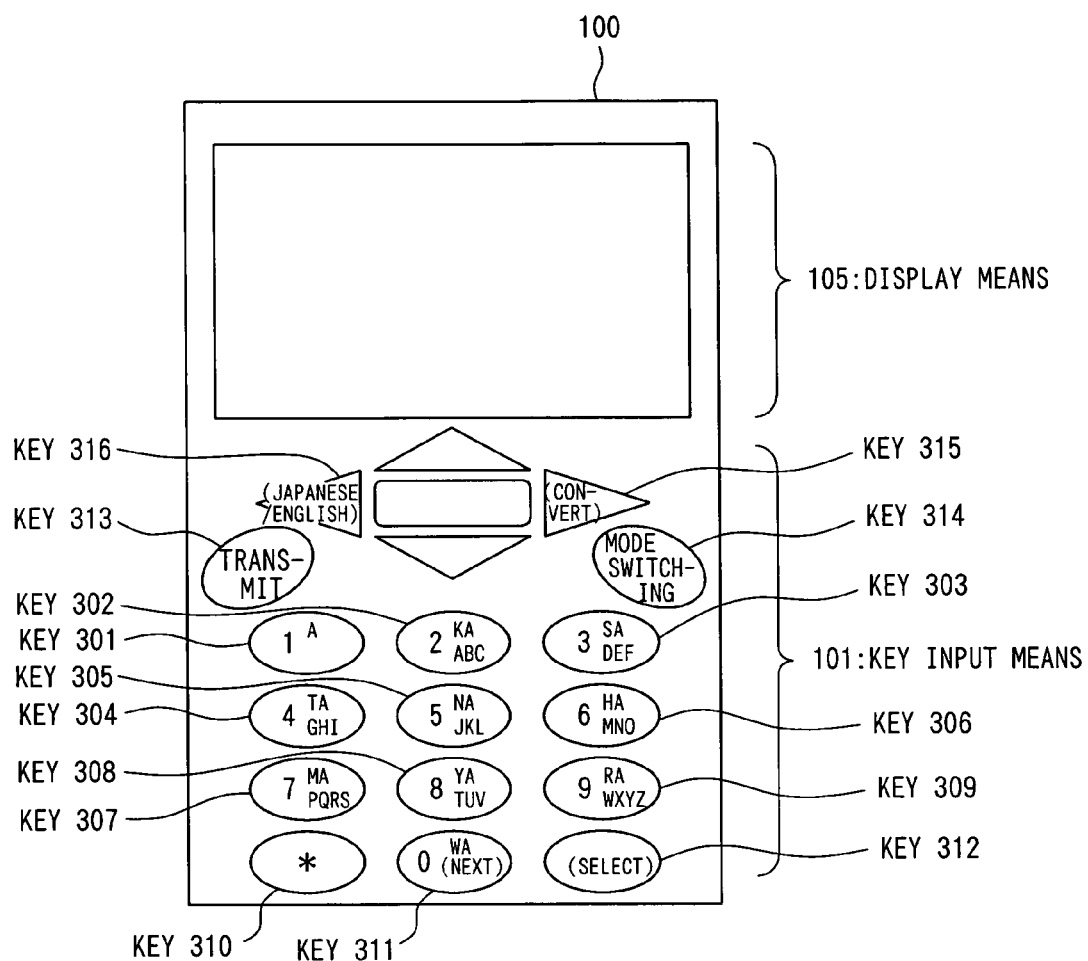
FIG. 13 shows an example of the appearance of the communications terminal apparatus according to a variation 2.

FIG. 13 shows a variation of the appearance of the communications terminal apparatus 100. In this example, text in not only English but also Japanese and a combination of English and Japanese can be transmitted with the keys and characters extended correspondingly. For example, the key 302 indicates not only English {A, B, C} but also Japanese characters of {KA, KI, KU, KE, KO}. FIG. 14 shows an example of the correspondence among the key, the key identifier, and the character in the key array in FIG. 13. In this example, Japanese specific pronunciation is generated by the (CONVERT) command, but a switching control command to generate Japanese specific pronunciation can be specifically defined. Katakana and Kanji can be generated by storing language knowledge data in advance and using (CONVERT) command after inputting Hiragana. The conversion from Hiragana to Katakana and Kanji can be easily realized using the conventional Kana-Kanji conversion method, for example, the method described in JP54-139356A and JP58-144246A.

In FIG. 13, the key 316 corresponds to (JAPANESE/ENGLISH) is a control command for switching input mode between Japanese and English. In the present variation, the input mode of the communications terminal apparatus 100 is normally a Japanese input mode. When the (JAPANESE/ENGLISH) command is issued, the input mode is changed. As shown in FIG. 14, since the key identifier corresponding to the (JAPANESE/ENGLISH) command is "1111", if the key 316 (uniquely) indicating the (JAPANESE/ENGLISH) command is pressed in step 201 shown in FIG. 7, then in step 203, the key identifier "1111" is appended to the code string K.

In step 204, the communications terminal apparatus 100 converts the code string K to the code string C. To convert the code string K, the communications terminal apparatus 100 analyzes the code string K from the leading key identifier to the trailer, and determines the character code corresponding to each key identifier. When determining a character code corresponding to one of the key identifiers of the code string K, the character to be determined depends on the occurrence of the key identifier "1111" toward the header from the key identifier. If there is no "1111" toward the header from the key identifier to be determined, the candidate character string corresponding to the key identifier cannot obtained from the row of English shown in FIG. 14 (this is referred to as a "masked" status of the English row). When "1111" appears in the code string K, until the next "1111" appears, the row of Japanese is masked. Similarly, each time "1111" appears in the code string K, the mask of the row of English and the mask of the row of Japanese are repeated.

Thus, by appending the key identifier corresponding to the (JAPANESE/ENGLISH) command to the code string K, the text of Japanese and English in a mixed manner can be efficiently transmitted without preparing a plurality of code strings K. Furthermore, according to the present invention, not only Japanese and English, any other languages can be combined by the definition of the control command.

(Variation 3)

Figure 15:
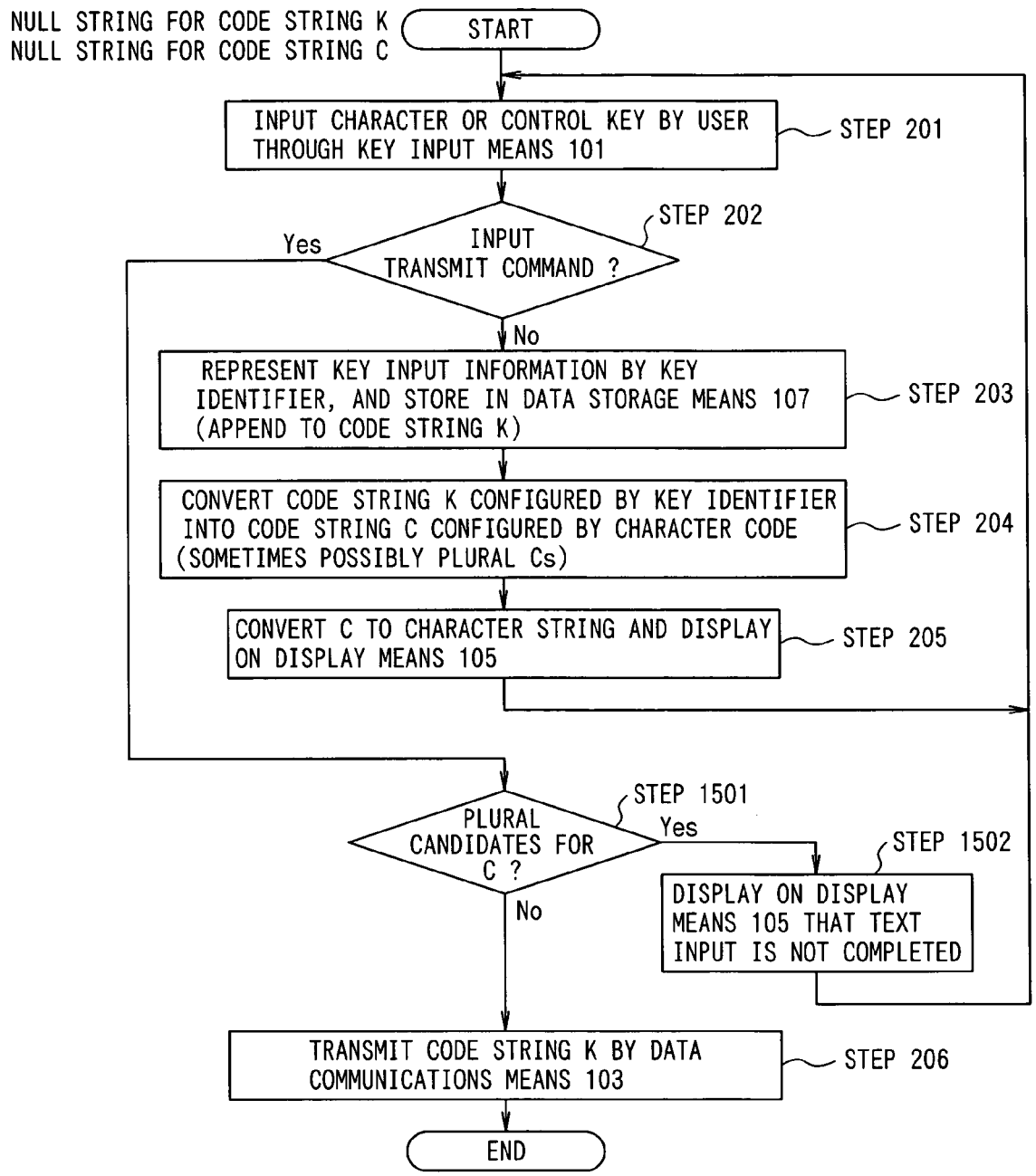
FIG. 15 shows an example of a flow of the process from generation to transmission of text data according to a variation 3.

FIG. 15 is a flow of an example of the flow of the process from the generation of text data to the transmission in the variation 3. In FIG. 15, a variation is explained but the overlapping portion with the explanation of FIG. 7 is omitted.

In FIG. 15, when the user presses the key 313 corresponding to (TRANSMIT) to specify transmission in step 201, the determination in step 202 is YES, and control is passed to step 1501. In step 1501, the communications terminal apparatus 100 analyzes the code string C stored in the data storage means 107, determines YES when the code string C is configured by a plurality of candidate character strings, and control is passed to step 1502. Otherwise, it is determined NO, and control is passed to step 206.

Configuring the code string C with a plurality of candidate character string indicates that the input of a character string has not been finished. That is, in step 201, the user pressed the key 313, but it was mistake. Therefore, in step 1502, the communications terminal apparatus 100 displays a message on the display means 105 to notify the user of it, and control is returned to step 201. In this case, it is invalid that the key 313 has been pressed. That is, the code string K is not transmitted, and the code string K and the code string C are in the state before the press of the key 313. The user continues input of a character string in step 201.

Figure 16:
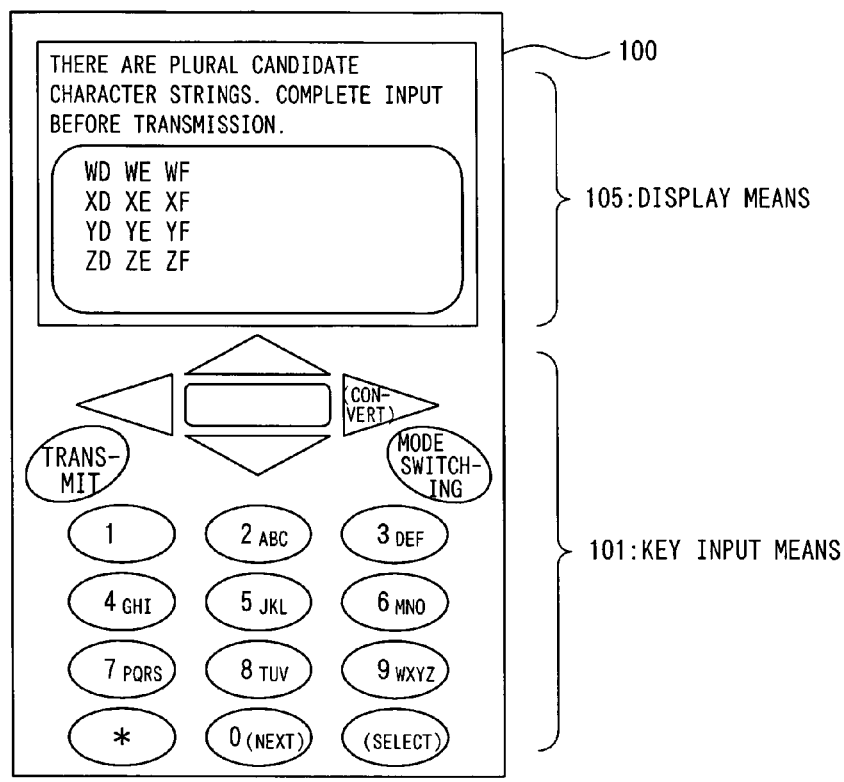
FIG. 16 shows an example of display of a message by the communications terminal apparatus according to a variation 3.

FIG. 16 shows an example of displaying a message in step 1502. In this example, in the embodiment in which text data of "YES" is transmitted, an example of a message displayed when the key 309 including "Y" and the key 303 including "E" are pressed, and the key 313 corresponding to (TRANSMIT) is pressed.

The user refers to the message, and determines one candidate by operating a key corresponding to the control command such as (CONVERT), (NEXT), (SELECT), etc by the key input means 101.

The communications terminal apparatus 100 issues a control command corresponding to an input key in response to the key operation of a user, and determines one candidate by the character string determination function 1011. Thus, one candidate character string can be determined to be displayed on the display means 105.

By the variations of the flows, when a character string is reconfigured from the code string K in the receiving apparatus, the ambiguity by a plurality of candidate character string can be resolved.

In step 1501, as a further variation, when the code string C is a null string, the determination YES can be made. With the determination, a null key identifier string which can be issued as a result of wrong input of pressing the key 313 before pressing the key corresponding to a character can be avoided.

To suppress transmission of the code string K when there are a plurality of candidate character strings in the code string C and the code string is a null string, when the code string C is configured only by one character code string, that is, there is only one character code string to be displayed on the display means 105, the code string K can be transmitted (it is determined NO in step 1501).

(Variation 4)

In the present embodiment, the communications terminal apparatus 100 shown in FIG. 1 can be an apparatus for receiving a key identifier string.

Figure 17:
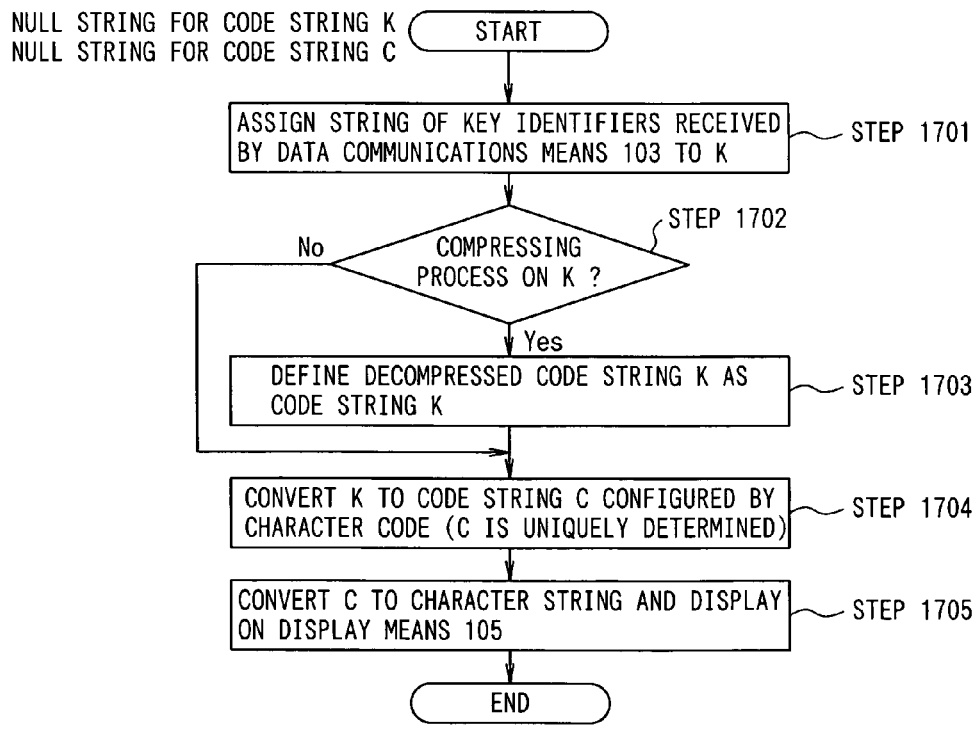
FIG. 17 shows an example of a flow of the process of receiving text data according to variation 4.

FIG. 17 shows a flow of the process performed when the communications terminal apparatus 100 receives a key identifier string, and displays a character string corresponding to the key identifier string. As a preparation before starting the flow, as in the above-mentioned embodiment, the initial status of the code string K and C are null string. The code string K is a row of key identifiers, and the code string C is a common character codes (for example, ASCII) indicating variables.

When the flow shown in FIG. 17 is started, first, in step 1701, the communications terminal apparatus 100 receives a key identifier string configured by key identifiers by the reception function 1032 of the data communications means 103. Furthermore, the communications terminal apparatus 100 assigns the received key identifier string to the code string K, and stores it in the 1073 of the data storage means 107.

In step 1702, the communications terminal apparatus 100 determines whether or not a compressing process (for example, in the method of the Reference 1) of decreasing the number of codes has been performed on the code string K. This determination can be made by checking whether or not the flag information indicating the compressing process for decreasing the number of codes is performed by the specific text data algorithm is contained in the code string K. If the determination is YES, control is passed to step 1703. If NO, control is passed to step 1704.

In step 1703, the communications terminal apparatus 100 expands the code string K in the expanding method corresponding to the text data compression algorithm, and the result is stored as the code string K in the data storage means 107.

In step 1704, the communications terminal apparatus 100 analyzes the code string K from the leading symbol by the character code string discrimination means 108, and converts into the code string C. In response to the control command such as (CONVERT), etc., using the language knowledge data accumulated in the language knowledge storage means 102, a correct data is selected from among a plurality of candidates for characters. The language knowledge data is the same as the data used in the communications terminal apparatus 100 on the transmission side. When the candidate character string is selected by the command (NEXT), the same process can be regenerated as in the apparatus in the transmission side, enabling the character string intended by the apparatus in the transmission side to be correctly reproduced. The code string C obtained in step 1704 is stored in the 107.

Then, in step 1705, by the character string presentation function 1051, the communications terminal apparatus 100 replaces the character code forming the character code string C with the corresponding character (font) and the result is displayed on the 105. When the process in step 1705 is completed, the process in FIG. 17 terminates.

When receiving the key identifier string formed by key difference, and if it is known in advance that the text data compression algorithm is not performed on the key identifier string, the process in steps 1702 and 1703 shown in FIG. 17 are omitted, and the processes from steps 1701 to 1704 can be performed.

As another example of variation, the key input means 101 shown in FIG. 1 can be simplified not to include a key to input characters. In this case, the communications terminal apparatus 100 cannot generate a character string, but it can be used as a simple communications terminal capable of receiving data only.

The present invention is available in an industrial field in which a character can be efficiently input with a smaller number of keys with the effect of reducing the amount of information when text data is transmitted, and efficient data transmission is requested using a communications terminal apparatus such as a mobile terminal, etc. having a relatively smaller number of input keys.

What is claimed is:

1. A communications terminal apparatus, comprising:
   a plurality of keys;
   a key identifier definition-storage area for storing a key identifier uniquely corresponding to each of the plurality of keys;
   an input key identifier storage area for adding and storing as a key identifier string the key identifier corresponding to said each of the plurality of keys obtained from the key identifier definition-storage area, when at least one of the plurality of keys is operated;
   a transmission function for transmitting the key identifier string stored in the input key identifier storage area, when a transmit instruction is detected,
   wherein when the key identifier is configured with the amount of information of n bits, where n is a natural number, the number of the plurality of keys is larger than (n−1)th power of 2, and is equal to or smaller than n-th power of 2.

2. The communications terminal apparatus according to claim 1, wherein the transmission function transmits the key identifier string stored in the input key identifier storage area after compressing the key identifier string.

3. The communications terminal apparatus according to claim 1, wherein the plurality of keys include a key for selection of the type of language.

4. A communications terminal apparatus comprising:
   a plurality of keys;
   a key identifier definition-storage area for storing a key identifier uniquely corresponding to each of the plurality of keys;
   an input key identifier storage area for adding and storing as a key identifier string the key identifier corresponding to said each of the plurality of keys obtained from the key identifier definition-storage area, when at least one of the plurality of keys is operated:
   a transmission function for transmitting the key identifier string stored in the input key identifier storage area, when a transmit instruction is detected;
   a character code definition storage area for storing at least one character code corresponding to said each of the plurality of keys;
   a character string presention function for presenting a candidate character string represented by a character code string corresponding to the key identifier string stored in the input key identifier storage area and discriminated based on the character code stored in the character code definition storage area; and
   language knowledge storage means for storing language knowledge data for analysis of a character string,
   wherein the character string presentation function further analyzes, based on the language knowledge data stored in the language knowledge storage means, the candidate character string discriminated based on the character code stored in the character code definition storage area, and presents the character string as the candidate character string.

5. The communications terminal apparatus according to claim 4, further comprising:
   a character string determination function for determining one candidate character string to be presented by the character string presentation function,
   wherein the transmission function transmits the key identifier string stored in the input key identifier storage area only when there is one candidate character string to be presented by the character string presentation function.

6. The communications terminal apparatus according to claim 4, further comprising:
   a reception function for receiving the key identifier string from an external device; and character code string discrimination means for discriminating the character code string corresponding to the key identifier string based on the key identifier string received by the reception function.

7. The communications terminal apparatus according to claim 4, wherein the transmission function transmits the key identifier string stored in the input key identifier storage area, after compressing the key identifier string.

8. The communications terminal apparatus according to claim 4, wherein the plurality of keys include a key for selection of the type of language.

9. A reception apparatus, comprising:
a reception function for receiving a key identifier string from a communications terminal apparatus according to claim 1; and
character code string discrimination means for discriminating, based on the key identifier string received by the reception function, a character code string corresponding to the key identifier string,
the communications terminal apparatus comprising:
a plurality of keys;
a key identifier definition-storage area for storing a key identifier uniquely corresponding to each of the plurality of keys;
an input key identifier storage area for adding and storing as a key identifier string the key identifier corresponding to said each of the plurality of keys obtained from the key identifier definition storage area, when at least one of the plurality of keys is operated;
a transmission function for transmitting the key identifier string stored in the input key identifier storage area, when a transmit instruction is detected
wherein when the key identifier is configured with the amount of information of n bits, where n is a natural number, the number of the plurality of keys is larger than (n−1)th the power of 2, and is equal to or smaller than n-th power of 2.

10. A program on a data storage means causing a computer to execute a process, comprising:
discriminating whether or not, when an operation signal of a key out of a plurality of keys is detected, a key identifier corresponding to the key represents a transmit instruction;
adding and storing the key identifier as a key identifier string in a key identifier storage area when the key identifier does not represent the transmit instruction in the discriminating; and
transmitting the key identifier string stored in the key identifier storage area when the key identifier represents the transmit instruction in the discriminating;
wherein when the key identifier is configured with the amount of information of n bits, where n is a natural number, the number of the plurality of keys is larger than (n−1)th power of 2, and is equal to or smaller than n-th power of 2.

11. A program on a data storage means causing a computer to execute a process comprising:
discrimination whether or not, when an operation signal of a key out of a plurality of keys is detected, a key identifier corresponding to the key represents a transmit instruction;
adding and storing the key identifier as a key identifier string in a key identifier storage area when the key identifier does not represent the transmit instruction in the discriminating; and
transmitting the key identifier string stored in the key identifier storage area when the key identifier represents the transmit instruction in the discriminating;
storing at least one character code corresponding to each of the plurality of keys;
presenting a candidate character string represented by a character code string corresponding to the key identifier string stored and discriminated based on the character code stored; and
storing language knowledge data for analysis of a character string,
wherein in the presenting, the candidate character string discriminated based on the character code is further analyzed based on the language knowledge data, and the character string is presented as the candidate character string.

* * * * *